(12) United States Patent
Rivera et al.

(10) Patent No.: US 6,366,407 B2
(45) Date of Patent: *Apr. 2, 2002

(54) LENTICULAR IMAGE PRODUCT WITH ZOOM IMAGE EFFECT

(75) Inventors: Jose E. Rivera, Rochester; James W. Meyer, Fairport; Alan L. Wertheimer, Pittsford; Kathryn B. Lomb, Rochester; Roger R. A. Morton, Penfield, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,553

(22) Filed: Jul. 12, 1999

(51) Int. Cl.[7] .......................... G02B 27/10; G03B 25/02
(52) U.S. Cl. ..................... 359/619; 359/625; 359/626; 40/454

(58) Field of Search .................................. 359/619, 625, 359/626, 621; 40/454, 453

(56) References Cited

U.S. PATENT DOCUMENTS

| | | | | |
|---|---|---|---|---|
| 4,970,547 A | * | 11/1990 | Desai | 355/61 |
| 5,724,758 A | * | 3/1998 | Gulick, Jr. | 40/454 |
| 5,963,203 A | * | 10/1999 | Goldberg et al. | 345/328 |
| 6,052,118 A | * | 4/2000 | Beeteson | 345/207 |

* cited by examiner

Primary Examiner—Georgia Epps
Assistant Examiner—Timothy Thompson
(74) Attorney, Agent, or Firm—William F. Noval

(57) ABSTRACT

A lenticular image product comprising: a lenticular material having an array of lenticules with cylindrical lenses; and a lenticular image associated with the lenticular material, the lenticular image having an original image having a wide angle view and at least one final image having a narrow angle view created from the original image, such that tilting of the lenticular image product produces a zoom effect between the original and final images.

12 Claims, 4 Drawing Sheets

LENTICULAR IMAGE PRODUCT WITH ZOOM IMAGE EFFECT

FIELD OF THE INVENTION

This invention relates in general to lenticular image products and more particularly to a lenticular image product having a zoom effect and method and apparatus for making such a lenticular image product.

BACKGROUND OF THE INVENTION

Lenticular image products include an array of cylindrical-shaped lenses (lenticules) in a lenticular material and a sequence of spatially interleaved images that are viewed through the lenticular material so that different ones of the interleaved images are viewed at different angles by the viewer. One image effect produced by the lenticular image is a depth or stereoscopic effect where the lenticules are oriented vertically so that one eye views one image of a stereo pair and the other eye views another image from the stereo pair. As the lenticular image product is rotated about the vertical axis, the viewer sees other stereo images of the same object or scene from different viewing angles giving the effect of "looking around" the object or scanning the scene.

Another image effect produced by the lenticular image is that of motion where different images in a motion image sequence are viewed by both eyes, while changing the angle at which the lenticular image is viewed. Thus, in motion imaging, the lenticules of the lenticular image product are oriented in a horizontal direction and the lenticular product is tilted about the horizontal axis.

Typically, lenticular images are formed from several different original views, either of the same object from different viewpoints or of the same object(s) as it progresses through a motion sequence. In the former case, the different views can be captured with a series of cameras positioned at different locations pointed at the same object, or the different views can be taken with the same camera which is positioned at the different locations, sometimes with the aid of a positioning structure. In the latter case, the same camera is usually used to capture the sequence of motion views. In all of these situations, the cost and complexity of equipment makes the formation of the lenticular image product beyond the means of many customers.

Many situations arise where it is desirable to produce a lenticular image having a zoom effect. Typically, this effect is produced by means of a series of images taken with a still or video camera having a zoom lens. At least the wide angle view and the closeup view are used along with one or more intermediate angle views to produce the zoom effect. Using this technique involves capturing and reproducing multiple original views and the inability to later modify the zoom subject or sequence.

There is thus a need to provide a lenticular image product having a zoom effect combining simple, cost effective image acquisition with great flexibility in composition and display.

SUMMARY OF THE INVENTION

According to the present invention there is provided a solution to the problems and fulfillment of the needs enumerated above.

According to a feature of the present invention there is provided a lenticular image product comprising: a lenticular material having an array of lenticules with cylindrical lenses; and a lenticular image associated with the lenticular material, the lenticular image having an original image having a wide angle view and at least one final image having a narrow angle view created from the original image, such that tilting of the lenticular image product produces a zoom effect between the original and final images.

According to another feature of the present invention there is provided a method of producing a lenticular image product having a zoom effect comprising: providing an original image having a wide angle view; creating at least one final image having a narrow angle view from said original image; and forming a lenticular image product from said original and final views.

According to a further feature of the present invention, there is provided a lenticular image product comprising: a lenticular material having an array of lenticules with cylindrical lenses; and a lenticular image associated with said lenticular material, said lenticular images having one or more additional images which have been created from a single original image.

ADVANTAGEOUS EFFECT OF THE INVENTION

The invention provides a lenticular image product having a zoom effect using digital processing methods. It combines simple, cost effective image acquisition with great flexibility in composition and display associated with the ability to manipulate images electronically.

DETAILED DESCRIPTION OF THE INVENTION

Figure 1:
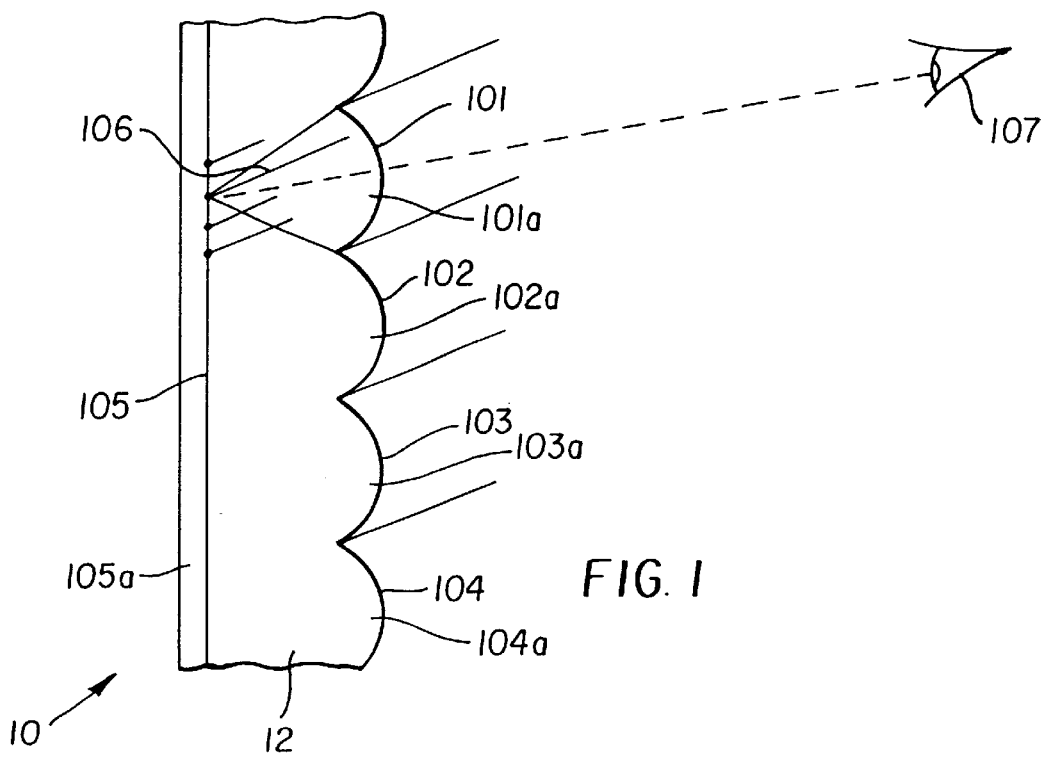
FIG. 1 is a sectional, diagrammatic view of a lenticular image product.

Referring now to FIG. 1, there is shown lenticular image product 10 includes lenticular material 12 having an array of aligned lenticules 101, 102, 103, 104, with respective cylindrical lenses 101a, 102a, 103a, 104a. A lenticular image 105 is associated with lenticular material 12. Lenticular image 105 includes a sequence of frames having interleaved strips 106 from each frame associated with each lenticule 101–104. Cylindrical lenses 101a–104a focus to lenticular image 105 and a specific set of strips 106 constituting a frame are seen at a particular viewing position by observer 107. As the viewing position changes either by tilting product 10 or by movement of the viewer relative to product 10, different frames are seen by observer 107. Generally the number of frames in a lenticular image corresponds to the number of strips behind each lenticule.

Lenticular image 105 can be an image formed in an image bearing layer (e.g., photosensitive layer) 105a coated on the back of lenticular material 12 by a laser printer or a contact printer. Lenticular image 105 can also be printed on lenticular material 12 by well known techniques such as thermal printing, ink jet printing, electrophotographic printing, conventional ink printing, etc. Lenticular image 105 may also be formed in a separate element which is then aligned with and laminated to lenticular material 12.

Lenticules 101–104 may be oriented in any direction, but typically are oriented in a horizontal or vertical direction for tilting about their respective axes.

Figure 2:
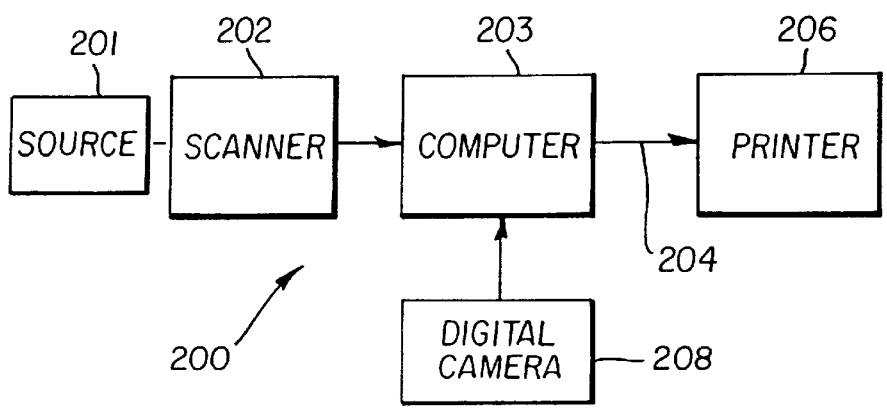
FIG. 2 is a block diagram of apparatus for implementing the present invention.

FIG. 2 shows apparatus 200 for generating lenticular image effects. Source image material 201 (e.g., one or more image frames) is scanned by scanner 202 and passed to computer 203. Alternatively, an image captured with a digital camera 208 is read directly into computer 203. Computer 203 generates a digital lenticular image file corresponding to the lenticular image 105. The digital lenticular image file includes a sequence of image frames that have been formed into image strips which are interleaved. A set of image strips are provided for each lenticule. Each set includes a strip representing each image frame.

The digital lenticular image file is passed to printer 206 which prints the lenticular image, either on the smooth side of lenticular material 12 such that the image strips 106 are in alignment with lenticules 101–104, or on a separate image bearing member which is brought into alignment with lenticular material 12 and bonded to it.

The creation of the content of the lenticular image 105 involves the process of selecting the content of each of the image frames constituting lenticular image 105. This is done by the operator of computer 203 selecting the proper sequence of frames. The operator works interactively with the computer display choosing frames until an appropriate sequence of frames is chosen. A simulation of the lenticular image can also be displayed prior to giving the command to print the image.

Figure 3:
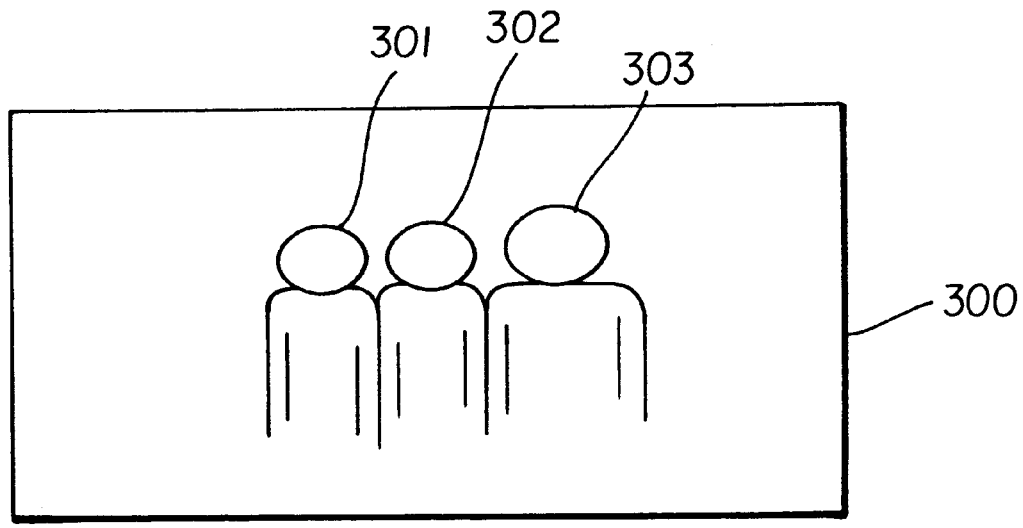
FIGS. 3–8 are diagrammatic views useful in explaining the present invention.

According to the present invention, a lenticular image having a zoom effect is produced from a single original image. The original image has a wide angle view of a scene such as a landscape or a building or of a group of individuals such as a family group or a sports team. FIG. 3 shows a typical group portrait including individuals 301, 302, and 303 in a still photograph 300. To produce a "zooming in" lenticular image of a particular image, a sequence of frames are created initially from the entire photograph and then frames are selected in such a way that there is the appearance of zooming in to a person of interest within the photograph.

To achieve this effect, the photographer or person ordering the image must indicate who the person of interest is in the photo they supply. This can be done by putting the print in a clear or semi-clear envelope and marking on the envelope corresponding to the position of the person of interest a circle or rectangle corresponding to the final view of the sequence. The original view is a wide angle view and the final view is a narrow angle view. Intermediate views have viewing angles intermediate these views. Both the initial view and the final view will generally include multiple frames so as to provide a clear image of both the whole group and the person(s) of interest.

In order to create this zoom in lenticular image, the operator at computer 203 will scan the entire image frame, which can be on a negative or print, or be supplied digitally. The person of interest is then identified by drawing a reference box around that person on the computer display. This frame will correspond to the final view in the sequence. An algorithm or imaging tool will then create the intermediate frames. The operator can then observe a simulated image to ensure that a pleasing effect has been produced before printing the image.

The creation of the simulated image involves accurately modeling aspects of the lenticular imaging process. These aspects can include:

1. Modeling the color of the final image.
2. Simulating the optical performance of the lenticular material either across the entire viewing range (where changes in optical viewing performance vary as a function of viewing angle) or by performing a fixed estimation of the optical performance of the lenticular material.
3. Simulating the appearance of the lenticules as seen by the viewer at his viewing distance.
4. Simulating the resolution characteristics of the image bearing member 105a.
5. Simulating the spot size or writing characteristics or both of the printer 206.
6. Providing a perspective view of the overall image as the angle changes with respect to the viewer.
7. Compensating for the illumination conditions where the final image is viewed.

Figure 4:
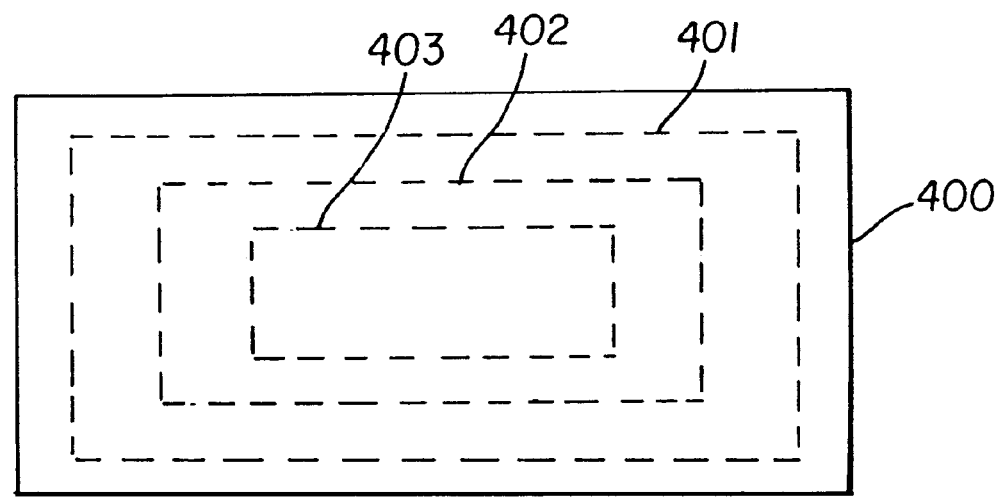

The operator of computer 203 can have available to him a variety of different algorithms or tools to generate different "zooming in" effects. For example, as shown in FIG. 4, one "zooming in" effect starts at the full image 400 and at the next frame (or at some subsequent frame), the segment 401 of the image shown by dots fills the full lenticular image by zooming in to the segment 401. A subsequent frame would comprise the image content 402 filling the full lenticular image. Finally the final frames include the view of interest constituting a fill view which is a zoomed up version of the content of crop box 403.

One disadvantage of this approach is that there is a large amount of motion associated with zooming in across the entire image. This can lead to considerable motion blur which may not be pleasing to the viewer.

Figure 5:
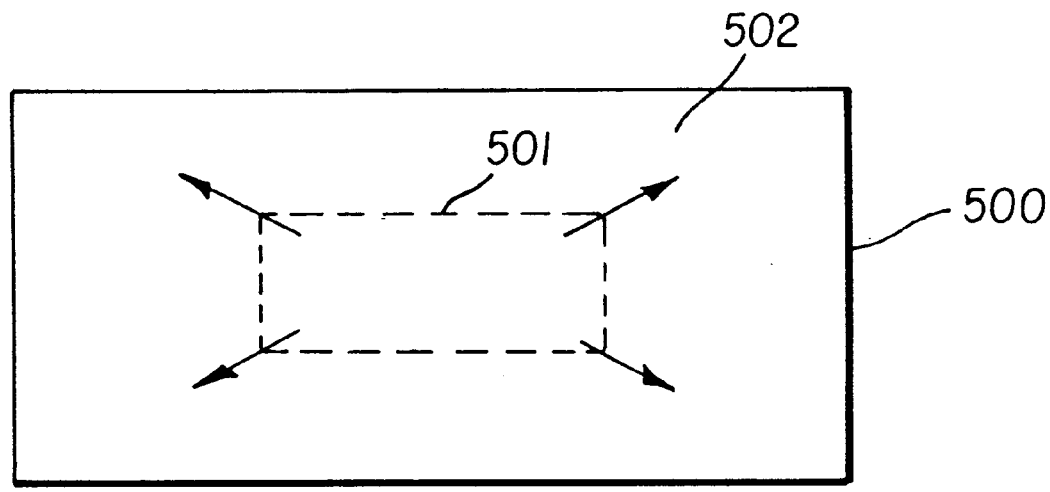

An alternate approach is shown in FIG. 5. The crop box 501 is chosen and subsequent images expand the size of the cropped image while the area 502 outside the cropped image corresponds to the original image 500. The advantage of this approach is that it introduces less motion blur.

Figure 6:
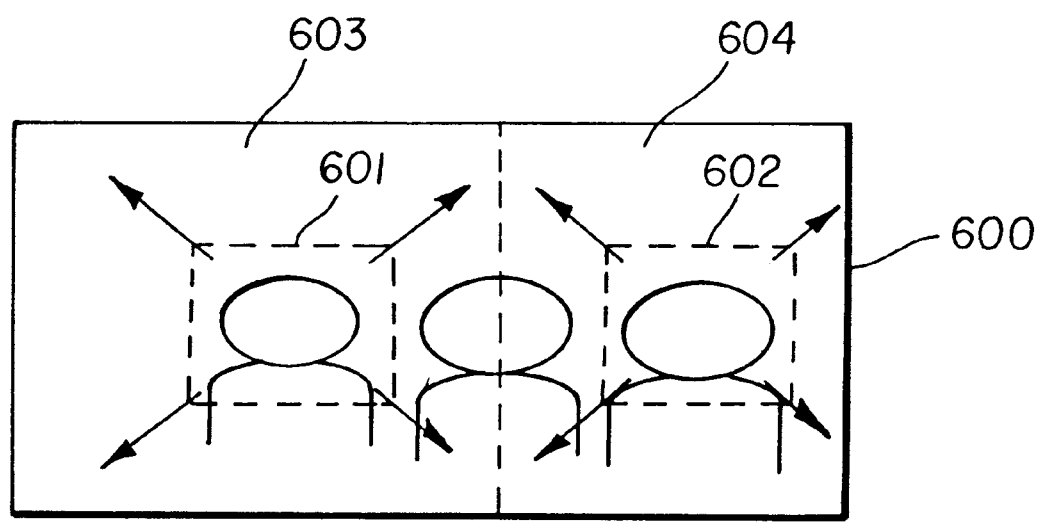

It will be appreciated that according to the invention more than one person may be zoomed into or that throughout the entire lenticular image sequence, one person may be zoomed into and then another one. As shown in FIG. 6, the original view 600 includes several people. Using two crop boxes 601 and 602 around different individuals, the cropped images can be expanded to zoom into the full image area. Thus, two individuals are seen side-by-side in area 603 and 604 in the final view. This expansion can be carried simultaneously or sequentially.

Figure 8:
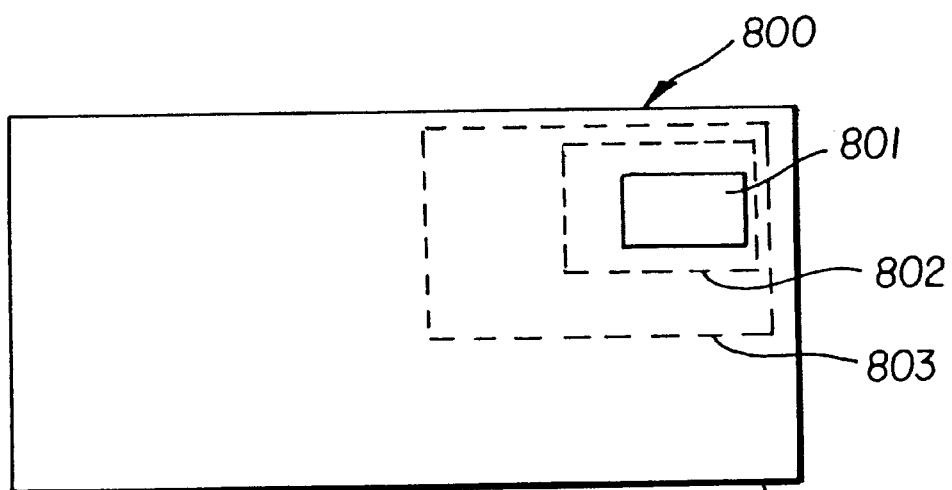

In the examples shown in FIGS. 5 and 6, the crop box(es) can move laterally, diagonally, or vertically as it grows to fill the entire available final view. Thus in FIG. 8, the original image 800 has a crop box 801 in the corner of the image identifying an area to be zoomed in on the cropped image is expanded diagonally through views 802, 803 to final image 804.

Figure 7:
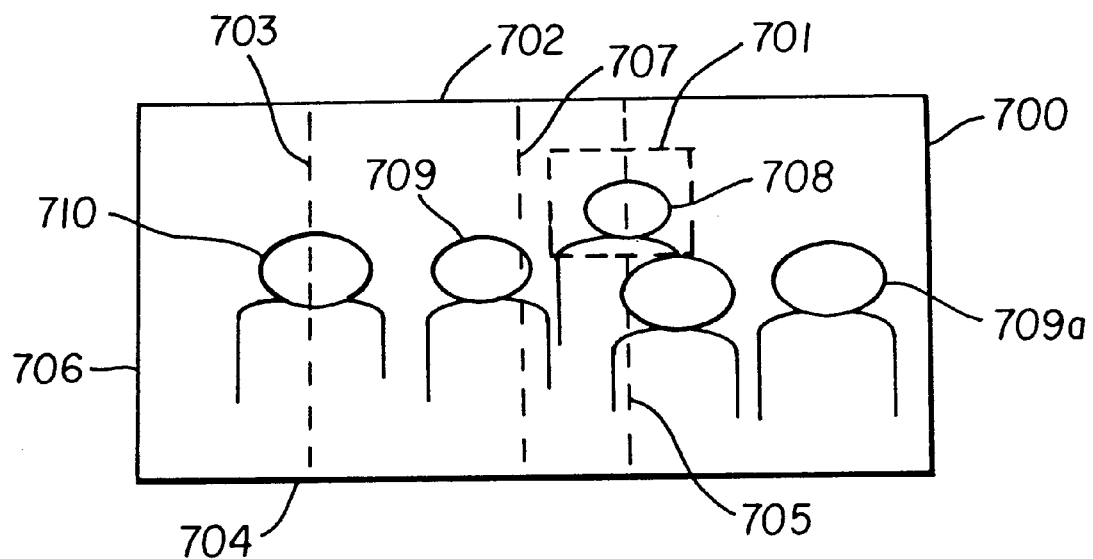

FIG. 7 shows another embodiment of the present invention with original view 700. As shown, the crop box need not expand to fill the entire final image but may leave some of the image area to correspond to the original image. Thus crop box 701 expands to fill the area bounded by lines 702, 703, 704, 705. In addition it is possible that the crop box expands to fill the area in the final image bounded by lines 702, 706, 704, and 707 such that both the zoomed in view of individual 708 and the original view appear simultaneously in the final image. If the person 709 is to be zoomed in on, then it is possible to move the original view of person 709 to the left while maintaining his size. As a result, the zoomed in view of person 709 appears in the area bounded by lines 702, 707, 704, and 706, while the final position is at 710.

In practicing any of the embodiments of the present invention discussed above, the intermediate images generated between the original image and the final zoomed in image can be processed with different imaging effects to render the lenticular image more pleasing or the like. Thus, the intermediate images can be blurred, can have reduced tonal range (e.g., darkened), can have different color range, or can have other visual effects to enhance the overall lenticular image.

The invention has been described in detail with particular reference to certain preferred embodiments thereof, but it will be understood that variations and modifications can be effected within the spirit and scope of the invention.

PARTS LIST

| | |
|---|---|
| 10 | lenticular image product |
| 12 | lenticular material |
| 101, 102, 103, 104 | lenticules |
| 101a, 102a, 103a, 104a | cylindrical lenses |
| 105 | lenticular image |
| 105a | image bearing layer |
| 106 | image strip |
| 107 | observer |
| 200 | apparatus |
| 201 | source image material |
| 202 | scanner |
| 203 | computer |
| 204 | digital lenticular image file |
| 206 | printer |
| 300 | still photograph |
| 301, 302, 303 | individuals |
| 400 | original image |
| 401 | segment |
| 402 | image content |
| 403 | crop box |
| 500 | original image |
| 501 | crop box |
| 502 | area outside of cropped image |
| 600 | original view |
| 601, 602 | crop boxes |
| 603, 604 | final view |
| 700 | original view |
| 701 | crop box |
| 702, 703, 704, 705, 706, 707 | lines |
| 708 | individual |
| 709, 709a | person |
| 710 | final position |
| 800 | original image |
| 801 | crop box |
| 802, 803 | views |
| 804 | final image |

What is claimed is:

1. A lenticular image product comprising:
   a lenticular material having an array of lenticules with cylindrical lenses; and
   a lenticular image associated with said lenticular material, said lenticular image having an original image having a wide angle view and at least one final image having a narrow angle view created from said original image, such that relative movement between said lenticular image product and a viewer produces a zoom effect between said original and final images wherein said original and said at least one final image represent the image taken at the same moment in time wherein said lenticular image includes one or more intermediate images created from said original image or said final image to enhance said zoom effect.

2. The lenticular image product of claim 1 wherein said one or more intermediate images present sequentially narrower angle views intermediate said original and final images.

3. The lenticular image product of claim 1 wherein said one or more intermediate images present sequentially larger images of said final view with said original image in the background.

4. The lenticular image product of claim 1 wherein two or more final views having narrow angles of view are created from said original image.

5. The lenticular image product of claim 1 wherein said one or more intermediate images are processed with a visual effect, including blurring, reduced tonal range, modified color range, to enhance the overall lenticular image.

6. The lenticular image product of claim 1 wherein said final image can appear to move laterally, diagonally or vertically as it expands to fill the full final image.

7. The lenticular image product of claim 1 wherein said lenticular image is formed in an image layer which is integral with said lenticular material.

8. The lenticular image product of claim 1 wherein said lenticular image is formed in a separate image layer which is joined to said lenticular material.

9. A method of producing a lenticular image product having a zoom effect comprising:
   providing an original image having a wide angle view;
   creating at least one final image having a narrow angle view from said original image,
   forming a lenticular image product from said original and final images, wherein said original image and said at least one final image represent the image taken at the same moment in time; and
   including selecting a portion of said original image to be created into said at least one final image.

10. The method of claim 9 including displaying said original image on an electronic display; selecting the portion of said original image corresponding to a final image; creating intermediate electronic images; and creating a simulated electronic lenticular image for display on said display to insure that a pleasing effect has been produced before forming said lenticular image product.

11. The method of claim 10 wherein said original image is provided by scanning a physical manifestation of said original image to produce a digital original image.

12. The method of claim 10 wherein in creating a simulated electronic digital image involves modeling one or more of the following aspects of the lenticular imaging process:
   modeling the color of the final image;
   simulating the optical performance of the lenticular material either across the entire viewing range (where changes in optical viewing performance vary as a function of viewing angle) or by performing a fixed estimation of the optical performance of the lenticular material;
   simulating the appearance of the lenticules as seen by the viewer at his viewing distance;
   simulating the resolution characteristics of the image bearing member;
   simulating the spot size or writing characteristics or both of the printer;
   providing a perspective view of the overall image as the angle changes with respect to the viewer; and
   compensating for the illumination conditions where the final image is viewed.

* * * * *